Feb. 25, 1947.  D. J. BONAWIT ET AL  2,416,427
MANUFACTURE OF TRACTIVE SURFACE DEVICES
Filed June 24, 1944    2 Sheets-Sheet 1
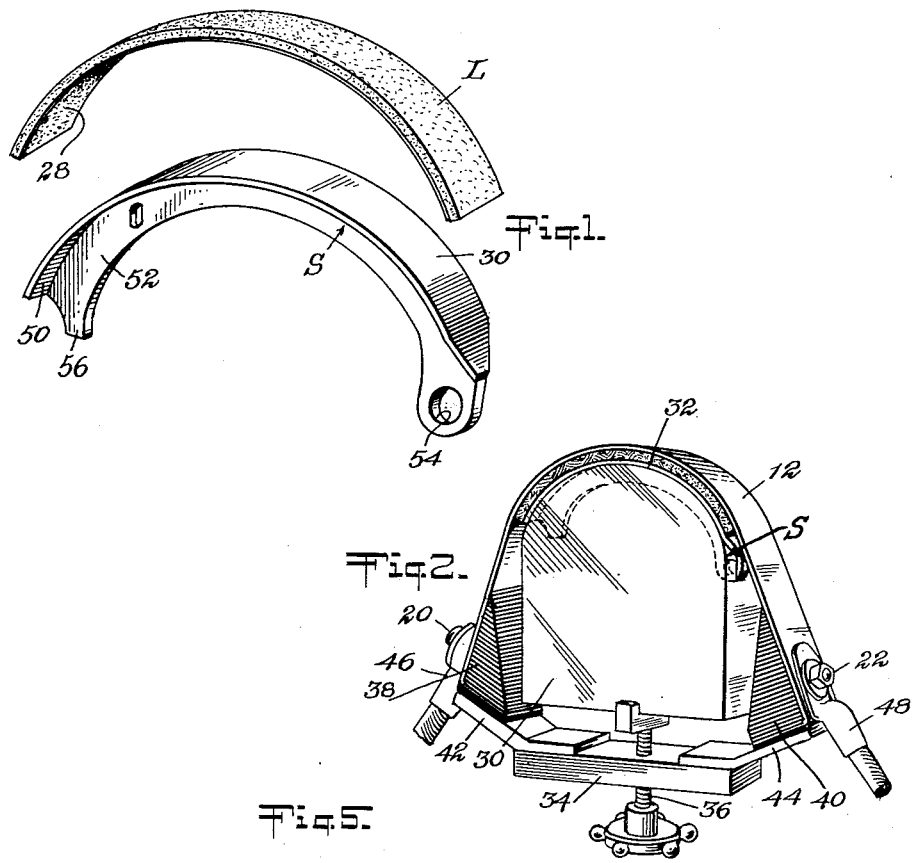
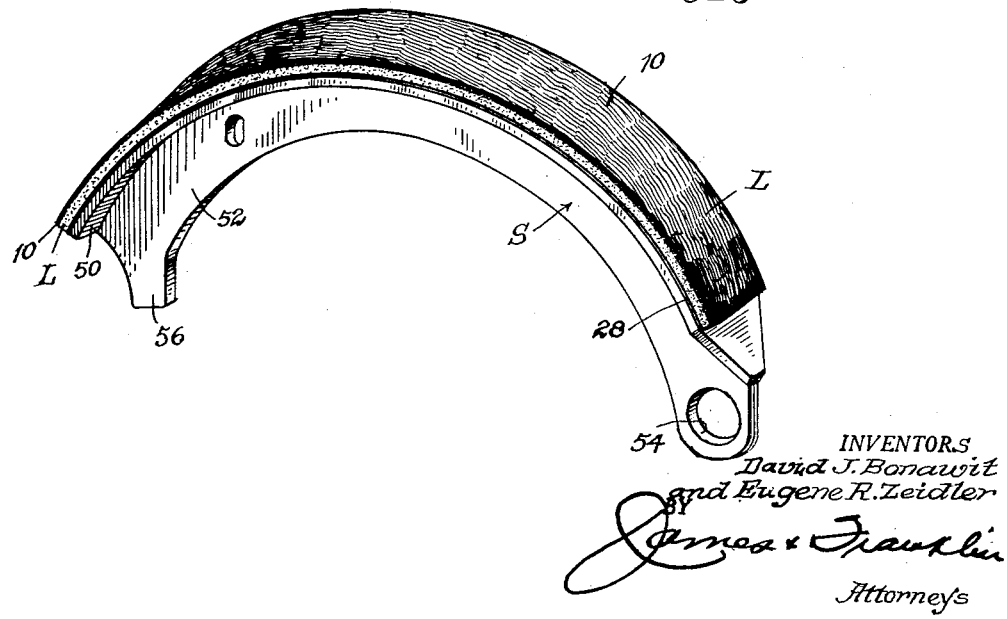
INVENTORS
David J. Bonawit
and Eugene R. Zeidler
Attorneys

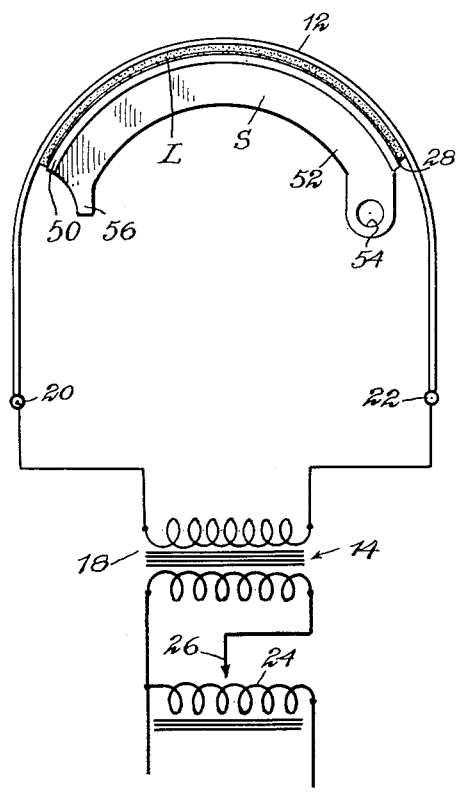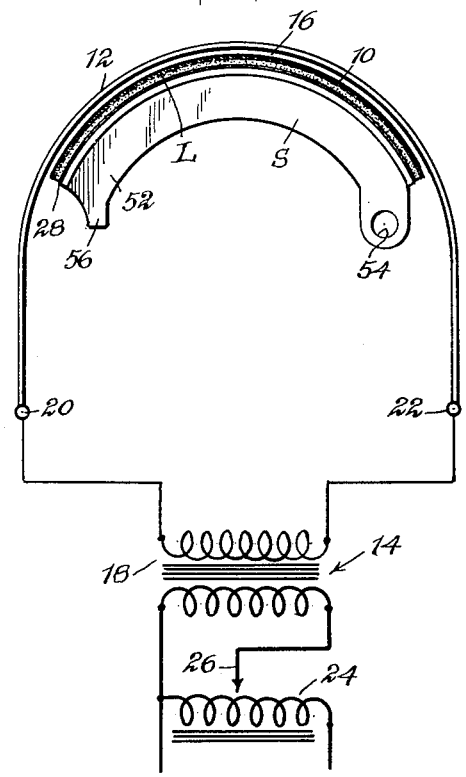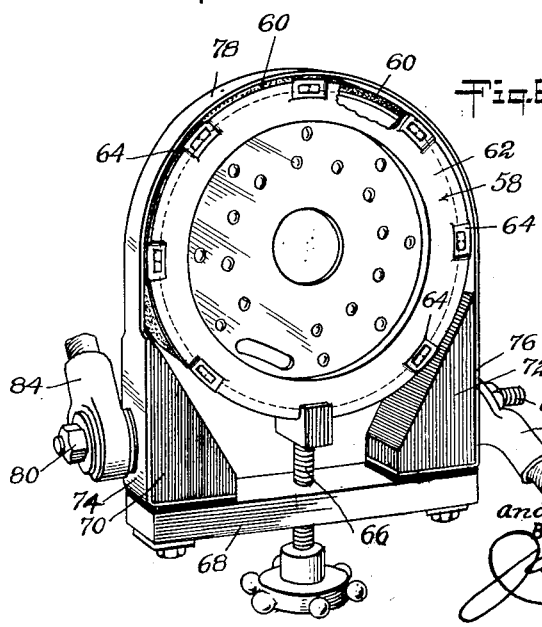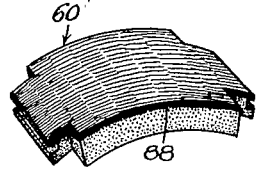

Patented Feb. 25, 1947

2,416,427

UNITED STATES PATENT OFFICE 2,416,427

MANUFACTURE OF TRACTIVE SURFACE DEVICES

David J. Bonawit, Glen Rock, and Eugene R. Zeidler, Paterson, N. J., assignors to Raybestos-Manhattan, Inc., Passaic, N. J., a corporation of New Jersey Application June 24, 1944, Serial No. 541,978

2 Claims. (Cl. 154—126)

1

This invention relates to the manufacture of tractive surface devices, such as brakes and clutches.

The prime object of our present invention centers about the heat treating of tractive surface bodies, such as brake blocks or brake linings, to effect a "surface toasting" of the same for the purpose of imparting to the tractive surface body a uniform friction coefficient characteristic. A further prime object of the invention centers about the use of the heat treating of such tractive surface bodies when in the form of brake linings for also adhesively attaching the same to a support such as a brake shoe.

Brake blocks or brake linings, and similar friction or tractive bodies, are made, for example, by mixing an organic binder, such as a synthetic resin, with relatively short fibre asbestos and various filling materials, molding the same to shape, and heating the same to convert the organic bond to its final infusible form. Such brake blocks or brake linings, particularly of the heavier duty type, and especially in their initial stages of use, do not possess a uniform coefficient of friction; and in many cases, this becomes a serious drawback, amounting to a defect. This lack of uniformity of the friction coefficient produces a "fading" effect, and by this is meant that when the friction material denotes a drop-off in its holding ability caused by a change in the heat developed, an increase in the applied input pressure to overcome this change is required. This "fading" is caused by a physical and chemical change occurring in the brake body when it becomes heated in braking use, such heat causing organic ingredients to ooze out on the friction or rubbing surface of the body, which act as an undesired lubricant. Brakes having a very uniform coefficient of friction during all including their initial stages of operation have become requisite, particularly for such special applications as airplane braking use.

We have found that a brake body, such as a brake lining or brake block segments, may be heat treated so as to eliminate this "fading" characteristic and so that a very uniform friction coefficient characteristic may be imparted to the tractive surface body. We have found that heat may be so localized during manufacture over the friction or tractive surface of the brake lining or brake block and may be applied in such a way and to such a degree as to distill off organic ingredients from the skin of the tractive surface body (without in any way causing any deterioration or breakdown of the tractive surface body) such as to impart thereto and particularly to the skin thereof the desired highly uniform friction coefficient property. The resulting product is devoid of any "fading" defect, the thus heat treated tractive body having a very uniform friction coefficient regardless of the temperatures that are developed during a brake application. This is especially desirable for such applications as airplane brakes so usually subject to overloading. The "surface toasting" which is produced enables the brake body to be used with higher efficiency during the first or initial stages of braking use; and thereafter, the tractive surface body continues to exhibit the same high uniformity in its friction coefficient characteristic.

According to our present invention, the heating treatment is also utilized when the brake body is in the form of a brake lining for adhesively attaching the brake lining to its metal support, such as a brake shoe. This heat treatment at the same time pre-conditions the brake lining for the subsequent "surface toasting" operation. According to this phase of our invention, the brake lining and the brake shoe are assembled with a thermosetting cement between the lining and the shoe and the assembly is heated by a localized heating source positioned over the top surface of the brake lining, heating of which to a desired temperature develops heat which is transmitted through the body and which is adequate in amount to set the thermosetting cement. The brake lining thus heat-welded to the brake shoe makes possible heat cementing at high speed and by quantity production methods.

To the accomplishment of these objects and such other objects as may hereinafter appear, our invention pertains to the method and subcombination method as sought to be defined in the appended claims and as described in the following specification, taken together with the accompanying drawings, in which—

Fig. 1 is a perspective view showing the assembling of a brake lining to a brake shoe prior to the heat treatment step or steps;

Fig. 2 is a perspective view of apparatus in which such a brake lining is heat treated in accordance with the principles of the present invention;

Fig. 3 is a schematic view of the apparatus of Fig. 2 and particularly the circuit parts thereof, and showing the heat treatment step used in adhesively attaching the brake lining to the brake shoe;

Fig. 4 is a view similar to Fig. 3 and showing the manner of using this apparatus for "surface toasting" the brake lining;

Fig. 5 is a perspective view of the brake shoe and lining after being treated according to the steps of the method depicted in Figs. 3 and 4;

Fig. 6 is a perspective view of the apparatus when employed for "surface toasting" brake block segments in an annular brake assembly; and Fig. 7 is a perspective view of one of the brake blocks as used in the assembly of Fig. 6 and depicting the condition of the same after a heat treatment operation.

The method of "surface toasting" a tractive surface body, according to the principles of the present invention, is illustratively depicted in Fig. 4 of the drawings, where the method is shown applied to the heat treating of a brake lining L attached to a brake shoe S, the resulting product being shown in Fig. 5 of the drawings. The brake lining L, which may have a thickness varying, say, from $\frac{3}{32}$ inch to $\frac{3}{8}$ inch, is shown as being provided with a darkened surface layer 10, representing the toasted skin effect produced in the heat toasting operation, said skin effect penetrating the thickness of the lining at its outer surface or portion to an extent approximating about one-third the thickness of the lining body. To produce this skin effect, a heating member, here in the form of a metal, such as a steel band 12, is localized over the top surface of the lining L and is heated to a temperature adequate to distill off organic ingredients from the skin 10 of the lining L. This localized heating is desirably produced by electrically heating the band 12 as by means of a heating system generally designated as 14. In this heating step, the band 12 is preferably spaced slightly the distance or spacing 16 from the friction surface of the brake lining L, for reasons that will appear presently.

The heating system generally designated as 14 may comprise a transformer 18 having its secondary connected to the terminals 20 and 22 of the metallic band 12 and having its primary connected to a voltage regulator 24, the connections including an adjustable contact 26, the said regulator being connected to power.

To produce the "surface toasting" of such a brake lining, the heating member or band 12 is heated to a temperature of the order of 1000° F. and within the range, for example, between 800° F. to 1200° F. The transformer 14 and regulator 24 are suitably selected to accomplish this result. For example, the transformer 14 may have a ratio of transformation such that the secondary circuit has an output voltage of 5.0 and an amperage of about 1600. For this purpose, the voltage regulator 24 is connected at its input to a 220 volt, 60 cycle, supply, the contact 26 being adjustable to regulate the voltage to suit different thicknesses of brake linings.

In "surface toasting" a brake lining, such as L, the current to the voltage regulator 24 is switched on; and within 8 to 10 seconds, the metal band 12 becomes red hot, the color indicating a temperature of about 1200° F. The total time of toasting heating for such a brake lining may be from 30 to 60 seconds. During this time, the organic ingredients in the lining, and particularly in the outer skin thereof, where the applied heat is of greatest intensity, is distilled off, as evidenced by the oozing out of a sticky liquid which may become ignited. When the distilling organic ingredients take fire, the flames are blown out with an air hose. This is permitted by the spacing 16 (which may be about ¼ of an inch distance) between the heating band 12 and surface of the lining L. The spacing also prevents oxidation and carbonization of the surface during this heating step and permits the burning off of the volatiles when the flash point is reached and the blowing out of the same by an air jet.

In the form of the invention shown in Figs. 1 to 5, the heating system is also utilized for adhesively attaching the brake lining L to the brake shoe S in an operation preliminary to the "surface toasting" operation. This heat treatment at the same time preconditions the brake lining for the subsequent "surface toasting" step. In this step of the invention, the brake lining L and the brake shoe S are assembled, as depicted in Fig. 1 of the drawings, with a thermosetting cement 28 between the lining and the shoe, and the assembly is placed in the heating apparatus, as shown in Figs. 2 and 3 of the drawings, with the heating band 12 thereof placed over and preferably in contact with the top surface of the lining L, and the said heating band is electrically heated to a temperature for developing heat and thereby transmitting the heat through the body of the lining L adequate to set the layer of thermosetting cement 28. The thermosetting cement 28 may, for example, be a synthetic resin base cement having a setting or curing temperature of about 320° F. This resin base cement may be coated on the inside surface of the brake lining L, as shown at 28, and may, if desired, be also coated over the contiguous face 30 of the brake shoe S. After coating, the cement may be permitted to dry and the cement-coated elements may then be assembled and placed into the apparatus of Fig. 2 for a heat cementing operation.

In this heat cementing operation, the same heating system 14 may be employed as shown in Fig. 3 of the drawings, the input of the voltage regulator being, however, for this purpose connected to a 110 (instead of 220) volt line. With this arrangement, there may be developed at the output of the secondary of the transformer 18 a voltage of about 2.5 and an amperage of about 800. The heating band 12 is thereby heated to a temperature of the order of 500° F., this temperature being, for example, within the range of 400° F. to 600° F. The heat thereby developed is adequate to be transmitted with the desired temperature gradient through the body of the lining L and to the layer or layers of thermosetting cement 28 for setting or curing this resin base cement. As the temperature transmitted to the cement layer increases, the cement softens, flows under the pressure applied in the apparatus to the edges of the brake lining L, hardens, and is cured. The time required for this heat setting operation in a brake lining as illustrated in the drawings and, for the heat-setting cement referred to, is approximately two minutes. It will be understood that the setting temperature will vary with the type of resin cement employed and that the setting time will vary with different types and thicknesses of brake linings.

The apparatus shown in Fig. 2 for mounting the brake assembly for both the cement setting and "surface toasting" operations may comprise a block 30 suitably curved and channelled at its top 32 for receiving the assembled brake shoe S and lining L, the said block 30 being vertically adjustable in a base 34 by means of the hand-operated adjusting clamp 36. The heating band 12 is secured at its terminals 20 and 22 to insulating blocks 38 and 40, which latter are suitably mounted on supporting strips 42 and 44 affixed to the base 34. The means for securing the terminals 20 and 22 to the insulating blocks may also serve for attaching connectors 46 and 48, forming the terminals of the wires leading from the transformer secondary.

Any steel fabricated or cast type of brake shoe S may be used, a T-section type of brake shoe being illustrated in the drawings. Such a brake shoe comprises a substantially semi-cylindrical metal brake shoe proper, designated as 50, and a metal web 52, arranged medially in a plane perpendicular to the shoe 50. The web is provided with means enabling the mounting of the shoe on the customary backing plate (not shown), such means comprising an orifice 54 at one end of the web 52 for receiving the pivot or anchoring pin and a toe 56 at the other end adapted to be connected to the usual wheel cylinder piston or operating cam. The brake lining L which is assembled to this brake shoe is customarily made as aforedescribed of asbestos fibres bonded with a thermosetting resin and is molded to a shape as shown in Fig. 1 of the drawings to accurately fit the top face 30 of the shoe element 50. As will be seen from Fig. 2 of the drawings, the top 32 of the block 30 is contoured to receive and mount this brake shoe assembly. After being mounted, the block 30 is vertically adjusted by the hand-operated clamp 36 to bring the band 12 into contact with the top surface of the lining L. As the band 12 is heated and due to heat expansion of the band, this adjustment may be continued to keep the brake shoe assembly under pressure during the heat setting or curing operation.

As will be understood from the foregoing, the apparatus of Fig. 2, including the circuit arrangement of Fig. 3, is utilized after this cement setting operation for "surface toasting" the brake lining L. To do this, the block 30 is released (adjusted downwardly) to space the brake assembly from the band 12 in the manner depicted in Fig. 4 of the drawings, and the input voltage of the transformer 14 is stepped up from 110 to 220 volts, the contact 26 of the regulator 24 being adjusted, if desired. The "surface toasting" step described is then carried out.

In the cement setting operation, no "surface toasting" of the brake lining occurs, as the temperature developed is too low or inadequate for this purpose. However, in addition to developing a sufficient temperature and a sufficient heat at the surface of the element 50 of the shoe to quickly heat said cement, a higher temperature, such for example as a temperature of 500° to 600° F., is active at the outer surface of the brake lining L, which is effective to drive off some of the lower end volatiles. This partially improves the friction coefficient characteristic of the brake body and this is effective for preconditioning the brake lining for the subsequent "surface toasting" operation.

The heat-welding or heat-cementing of the brake lining L to the brake shoe S makes possible heat-cementing at high speed and by quantity production methods. The resulting product obtained after the "surface toasting" operation is a brake body or lining which does not fade and which remains extremely uniform throughout its life when tested under severe conditions. The organic ingredients which give rise to a changing friction coefficient are removed from the lining without reducing or in any way impairing the desired physical characteristics of the brake body.

The heat toasting may be practised with other forms of brake bodies and brake assemblies. This is illustrated in Figs. 6 and 7 of the drawings, in which the "surface toasting" operation is shown applied to or practised with a circular brake assembly, generally designated as 58, about the periphery of which are mounted a plurality of brake block segments 60, 60, one of which is perspectively shown in Fig. 7 of the drawings, these brake block segments being mechanically located in position in the circular or annular metal support 62 by means of the deformations 64, 64 formed in the side walls of the metal support at its periphery. In this case, the block 30 of the apparatus shown in Fig. 2 is dispensed with, since the brake assembly 58 may itself be supported on and adjusted by the adjustable clamp 66, as clearly shown in Fig. 6 of the drawings.

In the apparatus shown in Fig. 6, the adjustable clamp 66 is rotatably mounted in a base element 68 which supports, by means of the fixed insulator blocks 70 and 72, the ends 74 and 76 of the metal heating band 78, the electric terminals 80 and 82 of which are inter-connected with the transformer lead terminals 84 and 86. As before, the clamp 66 is adjusted so as to slightly space the friction surfaces of the brake block segments 60, 60 from the band 78 after the manner shown in Fig. 4 of the drawings and the band 78 is heated by heating equipment, such as shown in Fig. 4 of the drawings, to a temperature of from 1000° F. to 1300° F. for a period ranging from 30 seconds to 60 seconds, or somewhat higher, until the full toasting effect is produced. In the arrangement shown in Fig. 6, one-half of the circumference of the braking assembly, and therefore one-half of the mounted brake block segments, is treated in one operation, after which the brake block assembly 58 is rotated 180° and the treatment repeated for the other half of the assembly and the remainder of the brake block segments. The result is that each brake block segment 60, as shown in Fig. 7 of the drawings, is provided with a toasted skin 88, having a depth or thickness corresponding to that heretofore described. The brake bodies of this brake assembly possess friction coefficient characteristics similar to that described above in connection with the brake lining L.

The manner of practising the method of the present invention and using the apparatus employed therewith, and the advantages flowing therefrom, will- in the main, be fully apparent from the above detailed description thereof. In practising the invention on different types of brake bodies, the heat is so localized over the friction or tractive surface of the brake body and is applied in such a way as to impart thereto the desired highly uniform friction coefficient characteristic. This is done without in any way causing any deterioration or break-down of the tractive surface body. The resulting product is devoid of any "fading" defect. The "surface toasting" which is produced enables the brake body to be used with utmost efficiency during initial stages of braking used, regardless of overload, and thereafter the brake body continues to exhibit the same high uniformity in its friction coefficient characteristic. The heating method and the apparatus used therewith may also be employed for such brake linings as shown in Figs. 1 to 5 of the drawings, for adhesively attaching the brake lining to its metal support, thus making possible an effective attaching method and brake lining cementing by means of very simple equipment usable at high speeds and by quantity production methods, this heat cementing operation also serving to pre-condition the brake body for its subsequent "surface toasting" operation.

By "surface toasting" in the following claims I mean such an application of heat, as to temperature and duration of application, to the surface of a tractive body, as shall selectively heat treat the tractive surface and layers close to the surface, but shall leave the main body substantially unaltered, in which heat treatment the tractive properties of the surface are affected as set forth above in the specification.

While we have described the practise of our method as applied to two types of brake assemblies and with the use of certain preferred apparatus, it will be understood that the method may be used with other apparatus and with other brake assemblies to accomplish similar results. It will also be understood that while we have shown the method used in connection with brake bodies, other tractive surface bodies, such as clutch facings, may be similarly treated. Many changes may therefore be made without departing from the spirit of the invention defined in the following claims.

We claim:

1. The method of heat treating a brake lining or brake block which consists in placing a heating band over and spaced slightly from the top surface of the lining or block and in electrically heating said band to a temperature adequate to distill off organic ingredients from the skin of the lining or block and thereby surface toasting the same.

2. The method of claim 1 in which the heating band is heated to a temperature of the order of 1000° F.

DAVID J. BONAWIT.
EUGENE R. ZEIDLER.

REFERENCES CITED

The following references are of record in the file of this patent:

UNITED STATES PATENTS

| Number | Name | Date |
|---|---|---|
| 881,471 | Hoffmann | Mar. 10, 1908 |
| 1,519,322 | Novak | Dec. 16, 1924 |
| 1,844,505 | Heintz | Feb. 9, 1932 |
| 2,272,532 | Shriver | Feb. 10, 1942 |
| 1,429,266 | Achtmeyer | Sept. 19, 1922 |
| 1,417,778 | Stanley | May 30, 1922 |
| 2,059,576 | Glick | Nov. 3, 1936 |
| 2,261,264 | Luty | Nov. 4, 1941 |
| 1,701,918 | Gillis | Feb. 12, 1929 |
| 2,129,125 | Geyer | Sept. 6, 1938 |
| 2,215,244 | Linzell | Sept. 17, 1940 |
| 2,306,054 | Guyer | Dec. 22, 1942 |